United States Patent [19]

Hollier et al.

[11] Patent Number: 5,341,420

[45] Date of Patent: Aug. 23, 1994

[54] NOISE-CANCELLING HANDSET

[75] Inventors: Michael P. Hollier; Kevin Welsby, both of Suffolk, England

[73] Assignee: British Telecommunications public limited company, London, England

[21] Appl. No.: 39,370

[22] PCT Filed: Sep. 5, 1991

[86] PCT No.: PCT/GB91/01513

§ 371 Date: Apr. 20, 1993

§ 102(e) Date: Apr. 20, 1993

[87] PCT Pub. No.: WO92/04792

PCT Pub. Date: Mar. 19, 1992

[30] Foreign Application Priority Data

Sep. 6, 1990 [GB] United Kingdom ............... 9019448
Nov. 28, 1990 [GB] United Kingdom ............... 9025853

[51] Int. Cl.$^5$ ........................................... H04M 1/00
[52] U.S. Cl. ................................. 379/433; 379/434
[58] Field of Search ............... 379/433, 434; 381/155, 381/158, 168, 92, 94, 91, 169

[56] References Cited

U.S. PATENT DOCUMENTS

| | | | |
|---|---|---|---|
| 3,004,103 | 10/1961 | Hart | 381/91 |
| 3,204,031 | 8/1965 | Gorike et al. | 381/91 |
| 3,573,400 | 4/1971 | Gerhard | 381/159 |
| 3,835,263 | 9/1974 | Killion | 381/169 |
| 4,463,222 | 7/1984 | Poradowski | 381/94 |
| 4,555,598 | 11/1985 | Flanagan et al. | 381/155 |
| 4,584,702 | 4/1986 | Walker, Jr. | 381/71 |
| 5,239,578 | 8/1993 | Regen et al. | 379/433 |

OTHER PUBLICATIONS

Patent Abstracts of Japan, vol. 11, No. 320 (3-550)(2767), Oct. 17, 1987 & JP A 62110349, May 21, 1987.

*Primary Examiner*—James L. Dwyer
*Assistant Examiner*—Jack Chiang
*Attorney, Agent, or Firm*—Nixon & Vanderhye

[57] ABSTRACT

A noise-cancelling telephone handset comprises a housing defining an earpiece (2) and a mouthpiece (3) housing a first order pressure gradient microphone (m). The housing is provided with two pressure-sensing locations (h1 and h2) in the region of the mouthpiece (3), these locations being connected to the microphone (m) by ducts (5). The pressure-sensing locations (h1 and h2) are spaced apart by a predetermined distance which is sufficiently large to permit locally-generated speech signals to produce a pressure gradient between the pressure-sensing locations while sound signals from distant sources produce substantially equal pressures at the pressure-sensing locations, whereby, in use, the output from the mouthpiece is substantially entirely that resulting from the locally-generated speech signals.

7 Claims, 1 Drawing Sheet

NOISE-CANCELLING HANDSET

BACKGROUND

I. Field of the Invention

The invention relates to noise-cancelling methods for microphones, and in particular to a noise-cancelling telephone handset.

II. Related Art and Other Considerations

Telephones are often situated in areas with a high level of background noise, for example at railway and underground (subway) stations, airports and adjacent to busy roads. Noise-reducing housings are not always provided for such telephones, as space may be limited, or fire regulations may not allow their use.

In a telephone handset, sound arriving from a distant sound source will tend to result in a uniform pressure over parts of the surface of the handset. Hence, at such points, a microphone system which detects pressure differences will produce little or no output. Sound propagating from a close source will, however, produce large pressure differences over the surface of the handset, and a microphone system which detects pressure differences can be made to produce a large signal.

The conventional approach to noise-cancelling handset design relies on an open mouthpiece structure around a first order pressure gradient microphone. A first order pressure gradient microphone is a microphone which detects a single pressure difference between two pressure-sensing locations. In this approach, both sides of the microphone diaphragm are exposed to the sound vibrations from a pair of holes (ports) in the mouthpiece housing, and distant noise is cancelled out because it creates substantially equal pressures on both sides of the diaphragm. The ports constitute the two pressure-sensing locations for the microphone. This approach is unsuitable for rugged payphone applications because the open structure is fragile, and would be prone to the ingress of dirt and moisture. Traditional theory suggests that the separation of the two pressure sensing locations must be much smaller than half a wavelength for useful cancellation in order that there is sufficient correlation between the noise signals. In practice, this means that the distance between two pressure-sensing locations is of the order of 5 mm, with a maximum separation of about 10 mm.

In non-telephony areas, second order boom microphones are used, for example by pilots, but these are not appropriate for telephony because they rely on the microphones being placed in position close to the mouth, and do not work properly if poorly positioned.

SUMMARY

The object of the invention is to provide an improved form of noise-cancelling in a telephone handset.

The invention is based upon the unexpected realization that correlation between signals from widely-spaced pressure-sensing locations is sufficient to permit useful noise cancellation to occur.

The present invention provides a noise-cancelling telephone handset comprising a housing containing a first order pressure gradient microphone, the housing having two pressure-sensing locations which are connected to the microphone by means of ducts whereby sound travels from the pressure-sensing locations to the microphone, the pressure-sensing locations being spaced apart by a predetermined distance which is sufficiently large to permit locally-generated speech signals to produce a pressure gradient between the pressure-sensing locations whilst sound signals from distant sources produce substantially equal pressures at the pressure-sensing locations, whereby, in use, the output of the microphone is substantially entirely that resulting from the locally-generated speech signals.

Advantageously, said predetermined distance is at least 20 mm. Preferably, said predetermined distance is less than 100 mm. More preferably, said distance lies within the range of from 30 mm to 80 mm. In the most preferred embodiment, said predetermined distance is 65 mm.

Conveniently, the pressure-sensing locations are positioned substantially along the longitudinal axis of the handset, and are constituted by holes formed in the housing.

In a preferred embodiment, the ducts comprise tubes extending in the handset from the pressure-sensing locations to the microphone. Alternatively, the handset is fabricated in part by moulding, and the ducts are moulded integrally with the handset.

BRIEF DESCRIPTION OF THE DRAWINGS

A noise-cancelling handset constructed in accordance with the invention will now be described in greater detail, by way of example, with reference to the accompanying drawings, in which.

DETAILED DESCRIPTION OF THE DRAWINGS

Figure 1:
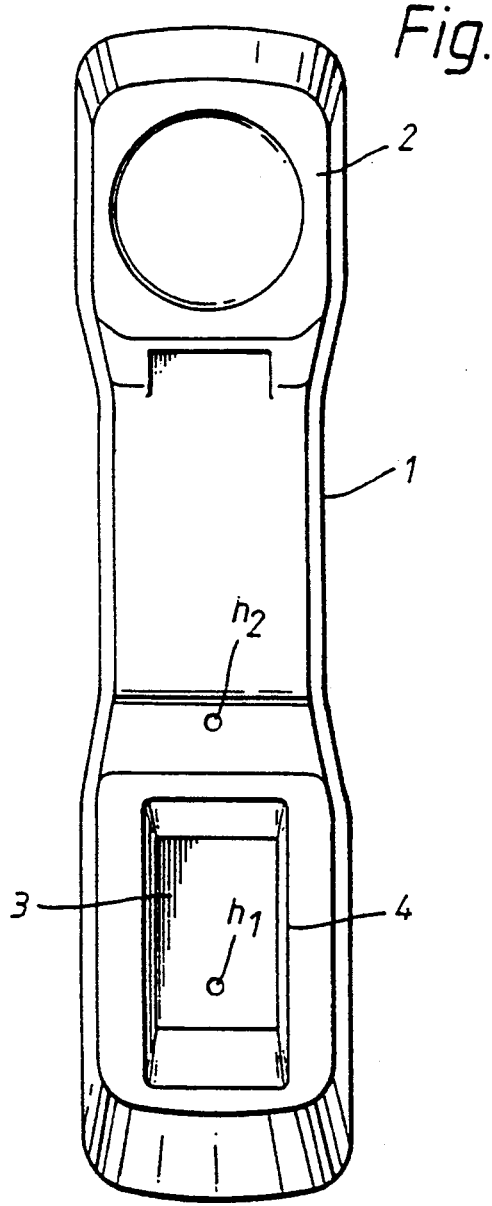
FIG. 1 is a schematic plan view of the telephone handset.

Referring to the drawings, FIG. 1 shows a handset 1 having a standard earpiece 2, and a mountpiece 3 located in a recess 4. A hole $h_1$ is located in the mouthpiece recess 4, and a second hole $h_2$ is located approximately 65 mm further up the handset 1 towards the earpiece 2. The holes $h_1$ and $h_2$ lead via acoustic tubes to a microphone m (see FIG. 2) located within the handset.

An important advantage of a noise-cancelling handset of the type shown, relying on direct acoustic noise cancellation rather than on an electrical or electronic noise cancellation technique, is that such a handset could be used to replace a standard handset, without having to change the circuitry in an associated telephone base unit.

The use of a single microphone m connected via tubes to the holes $h_1$ and $h_2$ with no special matching provides excellent noise cancellation, provided the holes are spaced to coincide with the practical pressure gradient discussed. As well as having major advantages for payphone applications, it is envisaged that this technique will have applications in many other areas. In particular, the increasing number of mobile communications systems would benefit from effective noise-cancelling.

Figure 2:
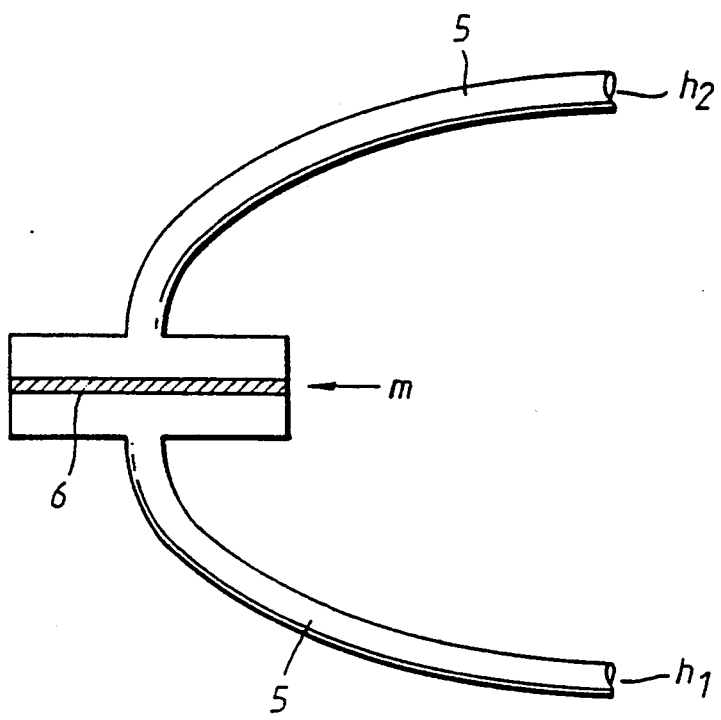
FIG. 2 shows the acoustic connection.

FIG. 2 shows an arrangement of tubes and microphone for use with the handset of FIG. 1. The system has a single, first order pressure gradient microphone (such as a Primo EM75B) m positioned within the handset housing substantially centrally with respect to the holes $h_1$ and $h_2$, and connected thereto by tubes 5. The microphone includes a diaphragm 6 and the holes $h_1$ and $h_2$ are connected to appropriate sides of this diaphragm 6. Noise from a distant source produces substantially equal pressures at the holes $h_1$ and $h_2$, whereas speech produces significantly different pressures at the two holes. These pressure differences are transmitted via the tubes 5, to opposite sides of the diaphragm 6 so that the microphone m will produce an output signal that is substantially entirely speech dependent.

As the microphone m is a pressure gradient microphone, it detects pressure differences directly.

The principal advantages of the type of noise-cancelling handset described above are:

it can be designed as a simple, compact arrangement incorporating a lightweight, proprietary microphone;

because it relies on the use of a face-side pressure gradient, there is no requirement for any openings on the back of the handset, where they could be blocked by the user's hand; and the use of a first order solution is tolerant of a wide range of positions of the handset with respect to the user's head.

A user at a noisy location will benefit from reduced noise in the "telephony ear" via the local side tone path, and the far end user will benefit from reduced background noise sent to line.

It will be apparent that modifications could be made to the telephone handset described above. In particular, the distance between the holes $h_1$ and $h_2$ can be varied to suit different handset constructions. A theoretical useful range for this distance is from 20 mm to 100 mm, but in practice this may be reduced to from 30 mm to 80 mm.

In another alternative construction, instead of tubes 5 being provided independently in the handset, ducts could be moulded into the handset body. This provides a more robust construction.

We claim:

1. A noise-cancelling telephone handset comprising a housing containing a first order pressure gradient microphone, the housing having on a face-side thereof two pressure-sensing locations which are connected to the microphone by means of ducts whereby sound travels from the pressure-sensing locations to the microphone, the pressure-sensing locations being spaced apart by a predetermined distance which is sufficiently large to permit locally-generated speech signals to produce a pressure gradient between the pressure-sensing locations whilst sound signals from distant sources produce substantially equal pressures at the pressure-sensing locations, whereby, in use, the output of the microphone is substantially entirely that resulting from the locally-generated speech signals, the predetermined distance being at least 20 mm and preferably between 30 mm and 80 mm.

2. A telephone handset as claimed in claim 1, wherein said predetermined distance is less than 100 mm.

3. A telephone handset as claimed in claim 1, wherein said predetermined distance is 65 mm.

4. A telephone handset as claimed in claim 1, wherein the pressure-sensing locations are positioned substantially along the longitudinal axis of the handset.

5. A telephone handset as claimed in claim 1, wherein the pressure-sensing locations are constituted by holes formed in the housing.

6. A telephone handset as claimed in claim 1, wherein the ducts comprise tubes extending in the handset from the pressure-sensing locations to the microphone.

7. A telephone handset as claimed in claim d1, wherein the handset is fabricated in part by moulding, and the ducts are moulded integrally with the handset.

* * * * *